(12) United States Patent
Imajo

(10) Patent No.: US 6,359,715 B1
(45) Date of Patent: Mar. 19, 2002

(54) PHOTOELECTRIC CONVERSION, METHOD LIGHT RECEIVING CIRCUIT, AND OPTICAL COMMUNICATION SYSTEM

(75) Inventor: Yoshihiro Imajo, Tokyo (JP)

(73) Assignee: Kokusai Electric Co., Ltd., Tokyo (JP)

(*) Notice: Subject to any disclaimer, the term of this patent is extended or adjusted under 35 U.S.C. 154(b) by 0 days.

(21) Appl. No.: 09/199,416

(22) Filed: Nov. 25, 1998

(30) Foreign Application Priority Data

Nov. 28, 1997 (JP) .............................................. 9-328472
Nov. 17, 1998 (JP) ......................................... 10-327013
Nov. 20, 1998 (JP) ......................................... 10-331187

(51) Int. Cl.[7] .............................................. H04B 10/06
(52) U.S. Cl. .................... 359/189; 330/308; 250/214 A
(58) Field of Search ................................ 359/189, 194; 250/214 A; 330/308, 254

(56) References Cited

U.S. PATENT DOCUMENTS 5,251,054 A * 10/1993 Lynn .......................... 359/189
6,072,366 A * 6/2000 Maeda et al. ................ 330/254
6,307,196 B1 * 10/2001 Thompson et al. ..... 250/214 A

* cited by examiner

Primary Examiner—Kinfe-Michael Negash
(74) Attorney, Agent, or Firm—Jacobson Holman, PLLC

(57) ABSTRACT

There is disclosed a photoelectric conversion method, a light receiving circuit, and an optical communication system, in which even if an average received light level varies, a constant output level of demodulated signal can always be obtained. In the photoelectric conversion method, the light receiving circuit and the optical communication system of the present invention, a light signal is received by a light receiving diode and converted to an electric signal. An alternating component is removed and a direct current component is taken out by a low-pass filter to detect an average received light level of the light, a difference of the average received light level and a preset reference voltage is amplified by a differential amplifier to output a control voltage of a variable gain amplifier, and the electric signal is amplified with a gain corresponding to the control voltage by the variable gain amplifier to obtain a demodulated signal.

6 Claims, 13 Drawing Sheets

(PRIOR ATR)

PHOTOELECTRIC CONVERSION, METHOD LIGHT RECEIVING CIRCUIT, AND OPTICAL COMMUNICATION SYSTEM

BACKGROUND OF THE INVENTION

1. Field of the Invention

The present invention relates to a photoelectric conversion method, a light receiving circuit and an optical communication system of an analog optical modulated signal, especially to a photoelectric conversion method, a light receiving circuit and an optical communication system in which a constant power level of demodulated signal can always be obtained.

2. Description of the Related Art

In a cellular phone system or another mobile communication system, analog optical transmission is performed in which a high-frequency signal for mobile communication is converted to light and transmitted via an optical fiber or the like.

In the analog optical transmission, for example, when a light signal transmitted from one plate needs to be simultaneously received in a plurality of places and converted to an electric signal, a passive light element called a star photocoupler is used to distribute the light signal, which is further transmitted via optical fibers or the like.

The star photocoupler is ideally an equipartition unit, but actually has a distribution deviation of about ±1 to 2 dB.

Moreover, the distributed light signals are transmitted through the optical fibers to reach the light receiving circuits. However, since the transmission distance via the optical fiber varies with the light receiving circuit, the propagation loss of light differs after distribution.

Furthermore, since the connection loss or the like of an optical connector or another optical connection portion is not identical, the average photoelectric power Pr incident upon each light receiving circuit differs.

In the analog optical transmission, CNR (carrier to noise ratio) of the received signal is represented by equation 1. In the equation, the relative intensity of light source noise (RIN), the optical modulation intensity (OMI), the photoelectric conversion efficiency of a light receiving element (η), the input conversion noise current density of an initial-stage amplifier (Ith), and a noise bandwidth (BW) are used.

$$CNR = \frac{\frac{1}{2}(OMI \cdot \eta \cdot Pr)^2}{\{RIN \cdot (\eta \cdot Pr)^2 + 2 \cdot q \cdot (\eta \cdot Pr) + \langle Ith^2 \rangle\}BW} \quad \text{[Equation 1]}$$

It is found in the equation 1 that if the relative intensity of light source noise (RIN), the optical modulation intensity (OMI), the photoelectric conversion efficiency of the light receiving element (η), the input conversion noise current density of the initial-stage amplifier (Ith), the noise bandwidth (BW) and other parameters are constant, the received CNR largely changes with the average received light level Pr.

Therefore, for the light signal transmitted from one place as described above, if the average photoelectric power Pr incident on the light receiving circuit differs with the distribution deviation at the time of distribution via the star photocoupler, the difference of transmission loss in the course of optical transmission and the difference of the connection loss of the photo connecting portion, the received CNR after optical demodulation or the output power level of the electric signal (corresponding to the numerator of the equation 1) differs.

As derived from the equation 1, the fluctuation of ±1 dB of received light power corresponds to the fluctuation of ±2 dB (sign of the same order) at the output power of the electric signal. Therefore, when the signal level of the electric signal demodulated from the light signal needs to be set the same at each light receiving terminal, some level compensating means is necessary.

Furthermore, the necessity of level correction will be described in detail.

In the analog optical transmission system of high-frequency signals for mobile communication such as a cellular phone, high-frequency signals are restored after the optical transmission, and need to be radiated to the space in the form of radio waves via antennas or the like.

When radio waves are radiated to the space, transmission power, spurious radiation, and the like are regulated according to an ordinance. In the analog optical transmission, the average received light power largely influences the power level of the high-frequency signal after optical demodulation. Specifically, as described above, the difference of 1 dB in the average received light power is enlarged to 2 dB as the high-frequency signal power level after the optical demodulation.

Ideally, when there is no distribution deviation of a light distributor, or there is a uniform transmission loss to each substation after distribution, the average received light power might be the same, which is not realistic.

In the existing circumstances, it is often unknown in the stage of apparatus manufacture the optical fiber with what degree of loss is to be connected to which port of the light distributor. Therefore, the gain regulation attributed to these factors (for adjusting the high-frequency output (transmission power) of each substation to the normal value) needs to be handled on the site after installation.

Moreover, if such value is known beforehand, it can be individually adjusted. In this case, however, the degree of freedom in the installation of the substation is remarkably lowered after the regulation. Specifically, only a specified substation must be connected to a specified branch output under constrains.

To solve these problems, a circuit has been heretofore used in which an additional function of regulating the output level (variable attenuator) is provided behind the light receiving circuit.

The conventional light receiving circuit will be described with reference to FIG. 12. FIG. 12 is a circuit diagram of the conventional light receiving circuit.

In the conventional light receiving circuit, a light receiving diode 1 is connected to a resistance 2 in series, a direct current voltage +Vb is applied to the anode side of the light receiving diode 1, and the other end of the resistance 2 is connected to the earth (grounded). Furthermore, a capacitor 3 whose one end is grounded is connected in parallel between the anode side of the light receiving diode 1 and the direct current voltage +Vb.

Moreover, a demodulation means constituted of a capacitor 4, an initial-stage amplifier 5, a main amplifier 6 and a variable attenuator 7 is connected to the connection point of the cathode side of the light receiving diode 1 and the resistance 2.

Here, the attenuation level in the variable attenuator 7 is variable, but needs to be preset. For example, the average loss or the like in the process of optical transmission is measured when the light receiving circuit is installed, and the attenuation level is adapted to the measurement.

In operation of the conventional light receiving circuit, the light signal subjected to the analog optical modulation is transmitted via an optical fiber to form a light signal P, which is received by the light receiving diode 1 and photoelectrically converted to form a high-frequency electric signal. Its alternating component (i.e., a transmitted signal obtained by demodulation) is amplified in the initial-stage amplifier 5 and the main amplifier 6 via the capacitor 4 and transmitted to the variable attenuator 7.

Subsequently, a constant level of demodulated output is obtained by performing attenuation in the variable attenuator 7 with the preset attenuation level.

However, in the aforementioned conventional light receiving circuit, once the attenuation level in the variable attenuator 7 is set, it is fixed. Therefore, if the average received light level of the analog modulated light signal received by the light receiving diode 1 varies, the output level of the demodulated signal also varies, which causes a problem that a constant output level cannot be obtained.

SUMMARY OF THE INVENTION

An object of the present invention is to provide a photoelectric conversion method, a light receiving circuit and an optical communication system in which a constant output level of demodulated signal can always be obtained even if the average received light level varies.

In the photoelectric conversion method of the present invention, a received light is converted to an electric signal, the average received light level of the received light is detected, and the electric signal is amplified or attenuated based on the detected average received light level to obtain a demodulated signal. The average received light level can be reflected on the amplification or attenuation of the electric signal.

Moreover, in the photoelectric conversion method of the present invention, a received light is converted to an electric signal, an alternating component is removed and a direct current component is taken out from the received light, the average received light level of the light is detected using the direct current component, a difference of the detected average received light level and the preset reference voltage is amplified to use the amplified voltage as a control voltage, and the electric signal is amplified or attenuated with the gain corresponding to the control voltage to obtain a demodulated signal. The average received light level can be reflected on the amplification or attenuation of the electric signal.

Furthermore, in the photoelectric conversion method of the present invention, a received light is converted to an electric signal, an alternating component is removed and a direct current component is taken out from the received light, the average received light level of the light is detected using the direct current component, the detected average received light level is shifted based on the preset reference voltage to use the shifted voltage as a control voltage, and the electric signal is amplified or attenuated with the gain corresponding to the control voltage to obtain a demodulated signal. The average received light level can be reflected on the amplification or attenuation of the electric signal.

Moreover, in the photoelectric conversion method of the present invention, a received light is converted to an electric signal, a received light voltage value obtained from the received light is converted to a digital value, the digital value is averaged to obtain an average received light level, a difference of the average received light level and the preset reference voltage value is calculated, a control voltage value is obtained corresponding to the difference, the control voltage value is converted to an analog signal, and the electric signal is amplified or attenuated with the gain corresponding to the analog signal to obtain a demodulated signal. The average received light level can be reflected on the amplification or attenuation of the electric signal.

Additionally, in the present invention, the light receiving circuit comprises a light receiving element to which a voltage is applied, a capacitor connected to one end of the light receiving element for removing a direct current component of an electric signal generated in response to a light received by the light receiving element and outputting an alternating component, a low-pass filter connected to the other end of the light receiving element for removing the alternating component of the electric signal generated in response to the light received by the light receiving element to output the direct current component as an average received light level, a differential amplifier for amplifying a difference of the average received light level outputted from the low-pass filter and the preset reference voltage, and a variable gain amplifier for receiving a voltage of the amplified difference as a control voltage to amplify or attenuate the electric signal of the alternating component outputted from the capacitor with a gain corresponding to the control voltage. The average received light level can be reflected on the amplification or attenuation of the electric signal.

Moreover, the light receiving circuit of the present invention comprises a light receiving element to which a voltage is applied, a capacitor connected to one end of the light receiving element for removing a direct current component of an electric signal generated in response to a light received by the light receiving element to output an alternating component, a low-pass filter connected to the other end of the light receiving element for removing the alternating component of the electric signal generated in response to the light received by the light receiving element to output the direct current component as an average received light level, a level shift circuit for shifting the average received light level outputted from the low-pass filter based on the preset reference voltage, and a variable gain amplifier for receiving a voltage of the shifted level as a control voltage to amplify or attenuate the electric signal of the alternating component outputted from the capacitor with a gain corresponding to the control voltage. The average received light level can be reflected on the amplification or attenuation of the electric signal.

Furthermore, the light receiving circuit of the present invention comprises a light receiving element to which a voltage is applied, a capacitor connected to one end of the light receiving element for removing a direct current component of an electric signal generated in response to a light received by the light receiving element to output an alternating component, an A/D converter connected to the other end of the light receiving element for converting the electric signal generated in response to the light received by the light receiving element to a digital signal to output the digital signal, a controller for averaging the digital signal to calculate an average received light level and to obtain a control voltage value corresponding to a difference of the average received light level and the preset reference voltage value, a D/A converter for converting the control voltage value to an analog signal to output the analog signal, and a variable gain amplifier for receiving a voltage of the analog signal as a control voltage to amplify or attenuate the electric signal of the alternating component outputted from the capacitor with a gain corresponding to the control voltage. The average received light level can be reflected on the amplification or attenuation of the electric signal.

Moreover, in the light receiving circuit of the present invention, an electronic attenuator may be used instead of the variable gain amplifier.

Furthermore, in the light receiving circuit of the present invention, an IC filter may be used instead of the low-pass filter.

Additionally, in the light receiving circuit of the present invention, the differential amplifier for amplifying the electric signal generated on the light receiving element is provided between the other end of the light receiving element and the low-pass filter. Even if the average received light level is small, the differential amplifier or the level shift circuit can be operated stably.

Moreover, in the light receiving circuit of the present invention, the differential amplifier for amplifying the electric signal generated on the light receiving element is provided between the other end of the light receiving element and the IC filter. Even if the average received light level is small, the differential amplifier or the level shift circuit can be operated stably.

Furthermore, in the light receiving circuit of the present invention, an operating amplifier may be used instead of the level shift circuit.

Moreover, the optical communication system of the present invention comprises a high-frequency source for generating a high-frequency signal, an electric/optical conversion circuit for performing analog optical modulation of the high-frequency signal to output a light signal, a star photocoupler for distributing the light signal, an optical fiber for transmitting the distributed light signal, and the light receiving circuit for demodulating the transmitted light signal to obtain a demodulated signal. Even if the light signal is transmitted with a transmission loss which varies with a path, and differs in the average received light level in each light receiving circuit, a constant output level can be obtained. Because the electric signal is amplified (attenuated) with the gain corresponding to the average received light level in each light receiving circuit to obtain the demodulated signal.

DESCRIPTION OF REFERENCE NUMERALS

Figure 1:
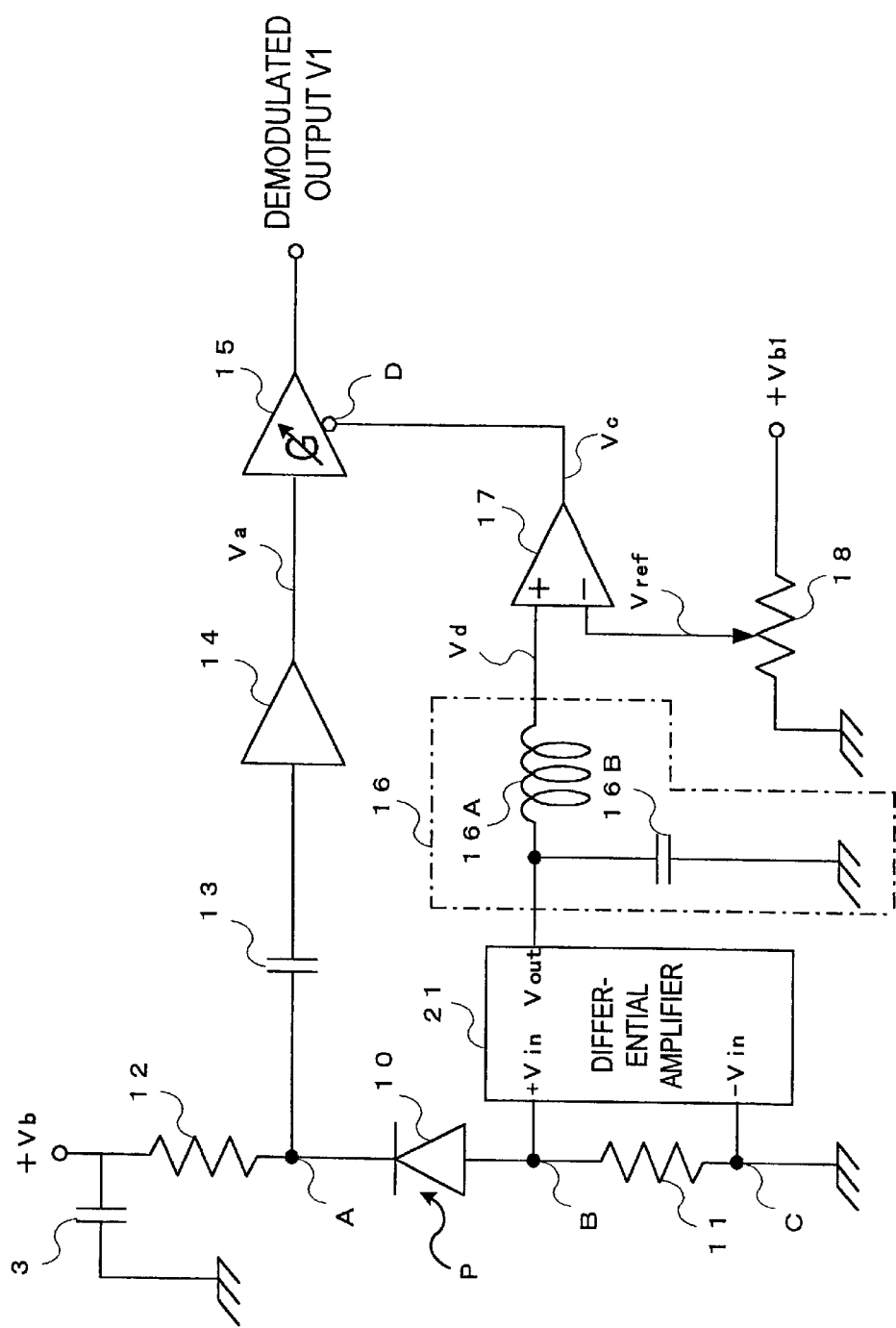
FIG. 1 is a circuit diagram of the first light receiving circuit according to the present invention.

1 . . . light receiving diode, 2 . . . resistance, 3 . . . capacitor, 4 . . . capacitor, 5 . . . initial-stage amplifier, 6 . . . main amplifier, 7 . . . variable attenuator, 10 . . . pin diode, 11, 12 . . . load resistance, 13 . . . capacitor, 14 . . . amplifier, 15 . . . variable gain amplifier, 16 . . . low-pass filter (LPF), 17 . . . differential amplifier, 18 . . . variable resistance, 19 . . . amplifier, 20 . . . level shift circuit, 21 . . . differential amplifier, 22 . . . electronic attenuator, 23 . . . A/D converter, 24 . . . CPU, 25 . . . D/A converter, 30 . . . high-frequency source, 31 . . . electric/optical converter, 32 . . . star photocoupler, 33, 35, 37, 39 . . . optical fiber, 34, 36, 38, 40 . . . light receiving circuit

DESCRIPTION OF THE PREFERRED EMBODIMENT

Embodiments of the present invention will be described with reference to the drawings.

In the photoelectric conversion method of the present invention, a received light is converted to a high-frequency electric signal, the average received light level of the received light is detected, and the electric signal is amplified or attenuated with an amplification or attenuation gain which is controlled in accordance with the detected average received light level to obtain a demodulated signal. Therefore, even if the average received light level varies, a constant output level of demodulated signal can always be obtained.

The first embodiment for realizing the photoelectric conversion method of the present invention will next be described with reference to the drawing.

In the light receiving circuit according to the first embodiment of the present invention, a light signal is received by a light receiving diode, and converted to a high-frequency electric signal by the generation of a photoelectric current corresponding to the light intensity. An alternating component is removed and a direct current component is taken out from the electric signal by a low-pass filter, so that the average received light level of the light is detected. A difference of the average received light level and the preset reference voltage is amplified by a differential amplifier, a voltage of the amplified difference is outputted as a control voltage in a variable gain amplifier, and the electric signal is amplified or attenuated with the gain corresponding to the control voltage to obtain a demodulated signal. Even if the average received light level varies, a constant output level of demodulated signal can always be obtained.

First, the structure of the first light receiving circuit according to the present invention will be described using FIG. 1. FIG. 1 is a circuit diagram showing the first light receiving circuit according to the present invention.

In the first light receiving circuit of the present invention, a pin diode 10 is used as the light receiving circuit, and load resistances 11, 12 of the same resistance value are connected in series on the opposite sides of the pin diode 10. A direct current voltage +Vb is applied to the load resistance 12 connected to the anode side of the pin diode 10, and the other end of the load resistance 11 is grounded (connected to the earth). Furthermore, a capacitor 3 whose end is grounded is connected in parallel between the load resistance 12 and the direct current voltage +Vb.

A demodulation means constituted of a capacitor 13, a low noise initial-stage amplifier 14 and a variable gain amplifier 15 is connected to a connection point A of the load resistance 12 and the pin diode 10.

A control voltage generating means, which is connected to a connection point B of the load resistance 11 and the pin diode 10, comprises a differential amplifier 21 for performing amplification with a voltage difference from a connection point C to the earth, a low-pass filter (LPF) 16 including an inductance 16A and a capacitance 16B, a differential amplifier 17 and a variable resistance 18. A gain G of the variable gain amplifier 15 is controlled with a control voltage Vc.

Additionally, in FIG. 1, the pin diode 10 is arranged in such a manner that the upper end forms an anode while the lower end forms a cathode, and the plus power of +Vb is applied to the anode side. Conversely, the pin diode 10 may be arranged to form the cathode on the upper end and the anode on the lower end, and the minus power of −Vb may be applied to the anode side.

Figure 2:
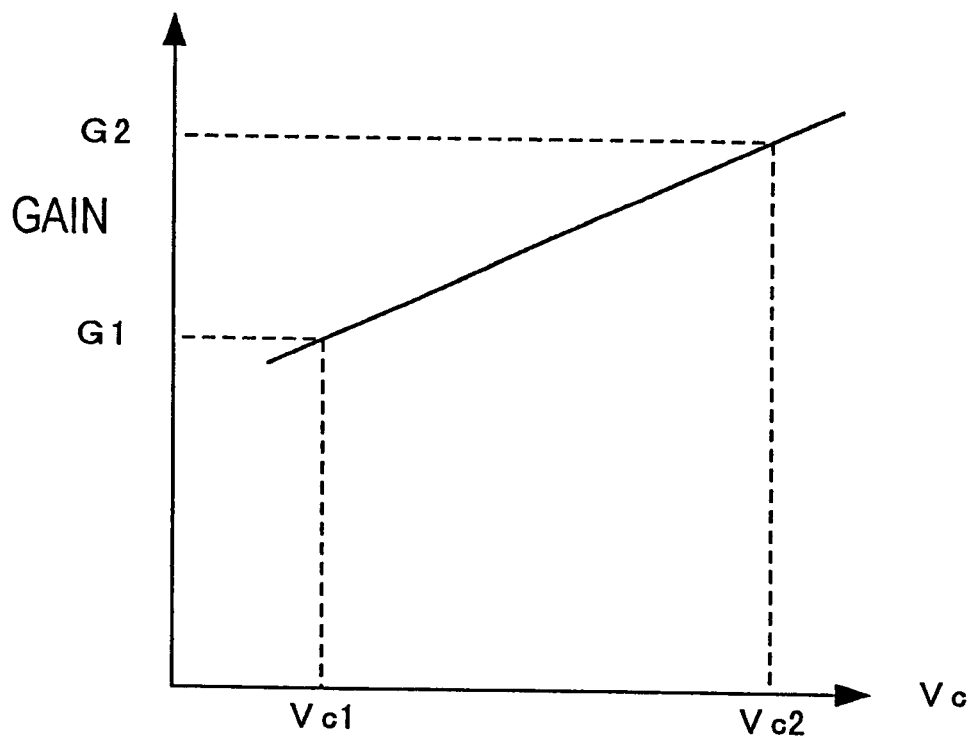
FIG. 2 is an explanatory view showing the gain control characteristic of a variable gain amplification circuit of the first light receiving circuit according to the present invention.

In the variable gain amplifier 15, the gain G is determined by the magnitude of the control voltage Vc transmitted from a control terminal D, and an input voltage is amplified in accordance with the gain G. The gain control characteristic in the variable gain amplifier 15 is shown in FIG. 2. For example, when the control voltage Vc is Vc1, the gain is G1. When it is Vc2, the gain is G2. Amplification is performed in accordance with the proportional relationship. FIG. 2 is an explanatory view showing the gain control characteristic of the variable gain amplification circuit of the first light receiving circuit according to the present invention.

Additionally, an electronic attenuator 22 whose attenuation factor can be controlled from the outside may be used instead of the variable gain amplifier 15.

Moreover, the differential amplifier 21 is provided in such a manner that a stable control voltage output can be obtained even if a light signal P is weak. Therefore, if the photoelectric current generated in the pin diode 10 has a sufficient magnitude for operating the differential amplifier 17, the differential amplifier 21 can be omitted.

Furthermore, the low-pass filter 16 may be IC filter in which the filter function is provided in an integrated circuit and the pass bandwidth can be controlled.

A reference voltage Vref, which is determined by initial setting, is applied to the negative input side of the differential amplifier 17 via the variable resistance 18. The variable resistance value is initially set, and fixed thereafter, but it may be dynamically changed.

The analog modulated light signal P herein transmitted to the pin diode 10 is a light signal obtained by modulating the analog signal of a base band or the like with a carrier wave. As the modulation method, a direct intensity modulation is performed.

The load resistances 11, 12 of the same resistance values are provided on the opposite side of the pin diode 10 in order to obtain electric signals which have the same level corresponding to the intensity of the incident light signal and different from each other in the phase by 180°.

The operation of the first light receiving circuit of the present invention will next be described.

The analog modulated light signal P transmitted via the optical fiber is converted to the electric signal at the pin diode 10, a current flows corresponding to the light intensity of the light signal P, and output voltages having the phases different by 180° and the same level are generated in the points A and B.

The output voltage of the point B is then amplified corresponding to a difference between upper and lower voltages of the load resistance 11 in the differential amplifier 21, an alternating component is removed by LPF 16, and only a direct current component Vd is outputted. The direct current component Vd corresponds to the average received light power.

The direct current component Vd is amplified corresponding to the difference from the reference voltage Vref in the differential amplifier 17, and transmitted to the control terminal D of the variable gain amplifier 15 as the control voltage Vc.

On the other hand, for the output voltage of the point A, its direct current component is removed by the capacitor 13, and only the alternating component is passed and amplified by the initial-stage amplifier 14 to form a signal Va. The gain G is determined by the magnitude of the control voltage Vc transmitted to the variable gain amplifier 15 via the control terminal D, and the modulated output is amplified according to the gain G, so that a demodulated output V1 is obtained.

The relationship of the control voltage Vc and the gain G is herein set in such a manner that the output power level of the demodulated output V1 becomes constant irrespective of the magnitude of the direct current component Vd. Specifically, when the reference voltage Vref is constant, the output value of the differential amplifier 17 corresponding to the fluctuation of the average received light level may be set or adapted to the gain control characteristic of the variable gain amplifier 15 (FIG. 2).

Specifically, the relationship of G(V1), Vc, Vd and Vref needs to be determined in such a manner that the demodulated output V1 is always made constant irrespective of the fluctuation of the direct current component Vd by controlling or reducing G if Vd increases and conversely by controlling or increasing G if Vd decreases.

Additionally, Vref can be regulated or changed by changing the resistance value of the variable resistance 18 or changing the Vb1 value itself to be applied to the variable resistance 18. Furthermore, the changing is manually performed, for example, at the time of initial setting or another time.

Furthermore, the value of the capacitor 13 or the characteristic of LPF 16 is not limited as long as the transmitted alternating wave or the average power can be detected. The capacitor and LPF are not limited to the circuit elements of FIG. 1.

The concrete circuit structure examples of the first light receiving circuit of the present invention will next be described with reference to FIGS. 3 to 6.

Figure 3:
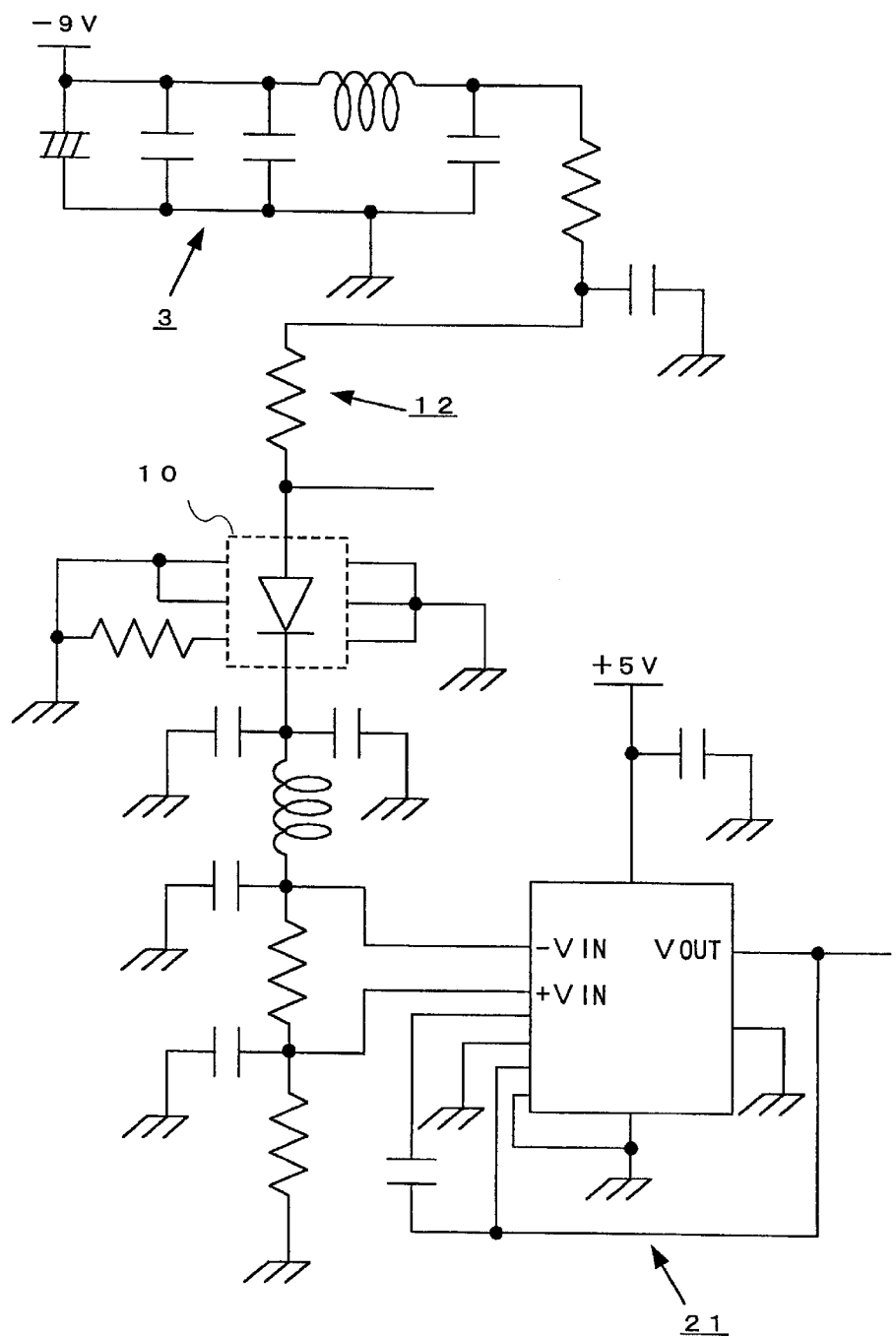
FIG. 3 is a concrete circuit diagram showing a pin diode, a load resistance, a capacitor and a differential amplifier in the first light receiving circuit of the present invention.

FIG. 3 shows a concrete circuit structure of the pin diode 10, the load resistances 11, 12, the capacitor 3 and the differential amplifier 21 in the first light receiving circuit of FIG. 1 in the present invention. However, in FIG. 3, the pin diode 10 is arranged to form a cathode on the upper end and an anode on the lower end, and a minus power (−9V) is applied to the anode side.

Figure 4:
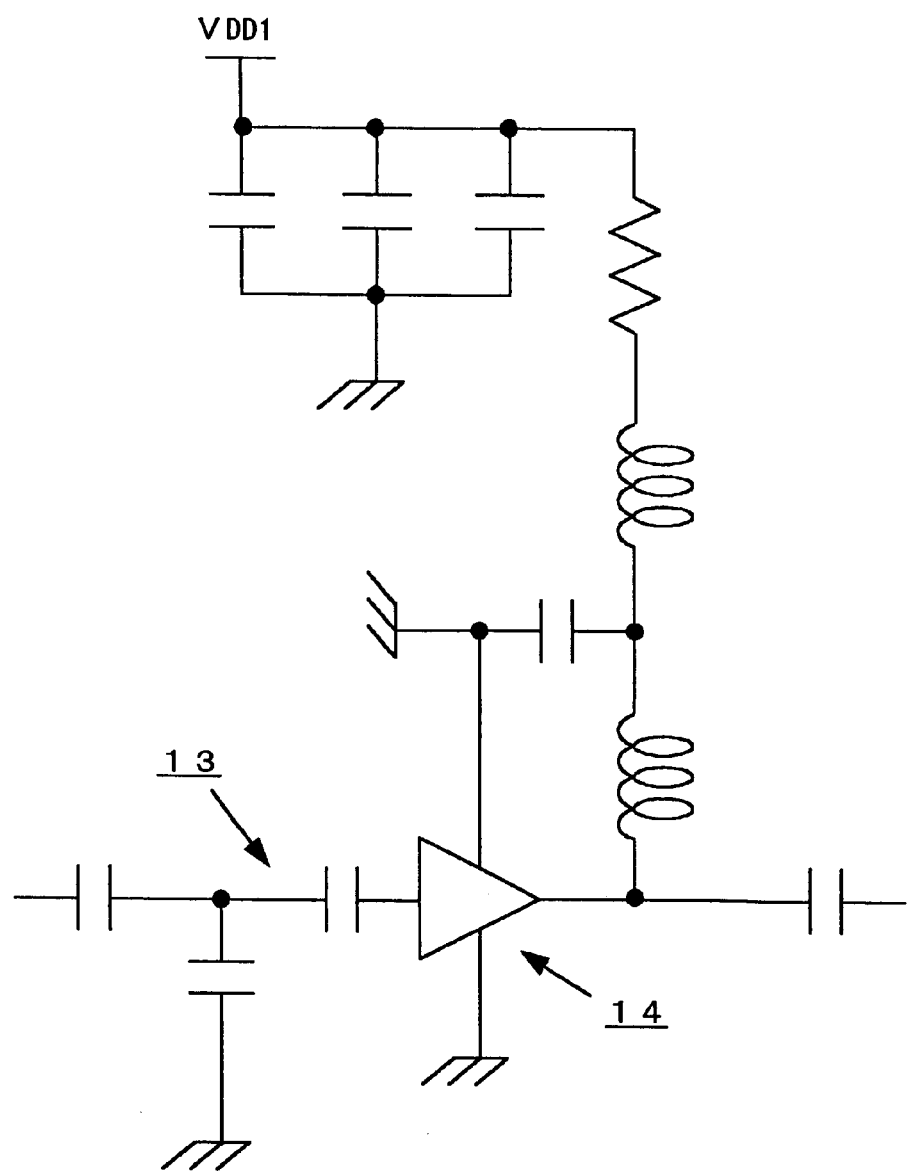
FIG. 4 is a concrete circuit diagram showing the capacitor and an initial-stage amplifier in the first light receiving circuit of the present invention.

Moreover, FIG. 4 shows a concrete circuit structure of the capacitor 13 and the initial-stage amplifier 14 in the first light receiving circuit of the present invention.

Figure 5:
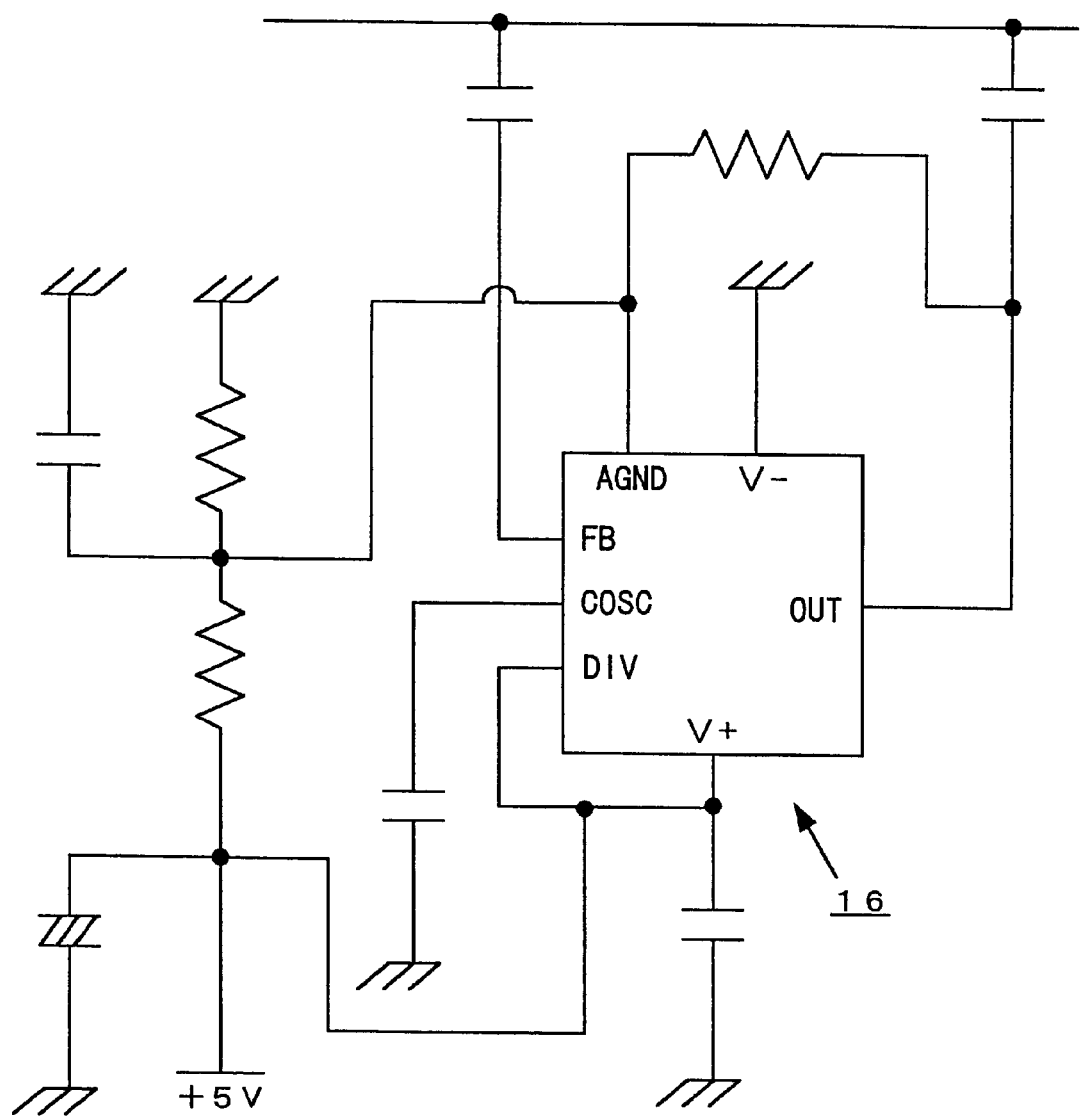
FIG. 5 is a concrete circuit diagram showing a low-pass filter in the first light receiving circuit of the present invention.

Furthermore, FIG. 5 shows a concrete circuit structure of the low-pass filter 16 in the first light receiving circuit of the present invention.

Figure 6:
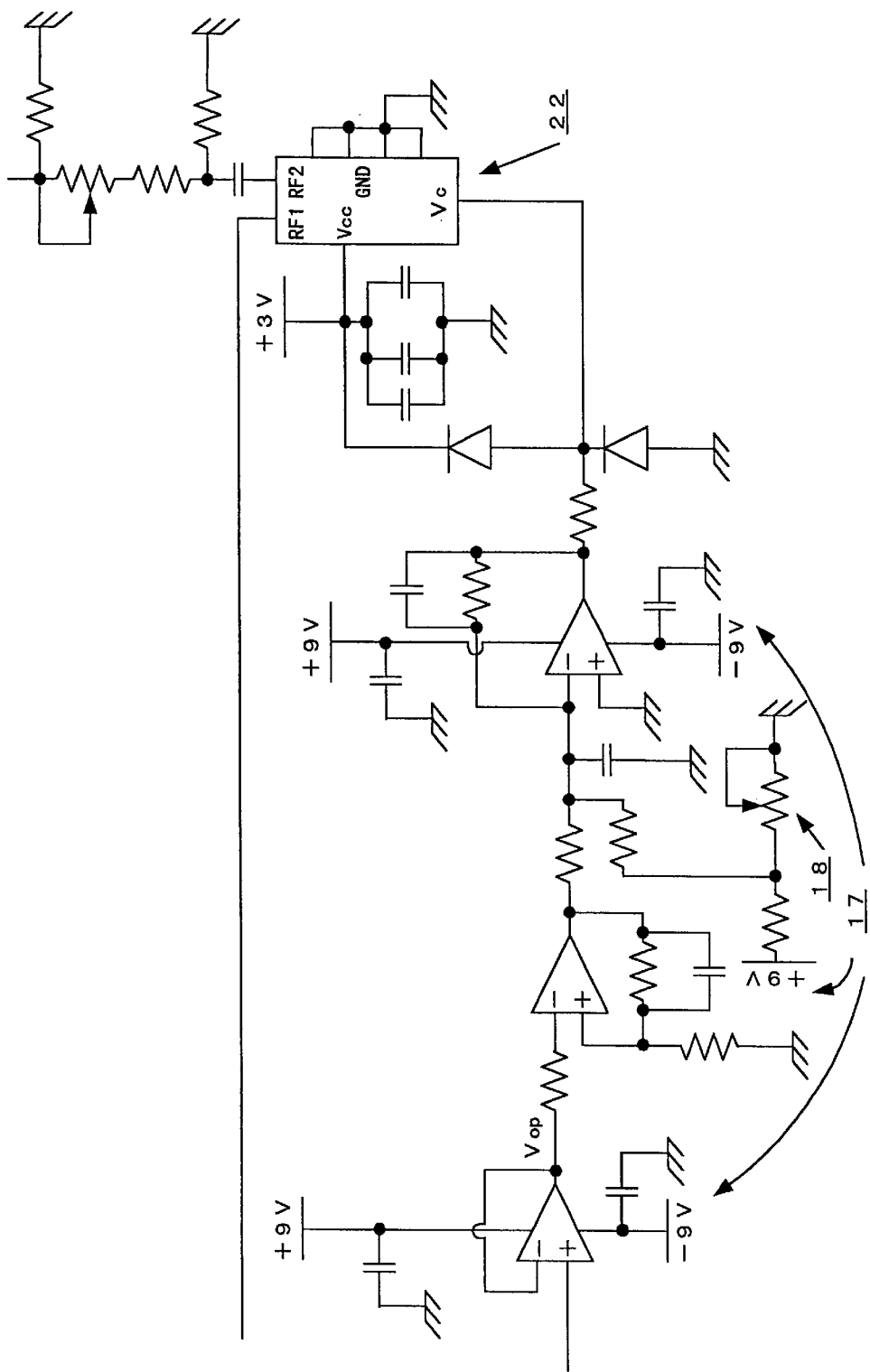
FIG. 6 is a concrete circuit diagram showing the differential amplifier, a variable resistance and a variable gain amplifier in the first light receiving circuit of the present invention.

Additionally, FIG. 6 shows a concrete circuit structure of the differential amplifier 17, the variable resistance 18 and the variable gain amplifier 15 in the first light receiving circuit of the present invention. However, in FIG. 6, the electronic attenuator 22 is used instead of the variable gain amplifier 15.

In the light receiving circuit according to the first embodiment of the present invention the direct current component in the received light voltage (average received light level) is taken out by the low-pass filter 16, the control voltage is generated in the differential amplifier 17 in which amplification is performed in accordance with the difference from the reference voltage, and the alternating component in the received light voltage is amplified with the gain corresponding to the control voltage to obtain the demodulated signal. Therefore, the demodulated signal of the same level can advantageously be obtained irrespective of the fluctuation of the received light voltage level.

Moreover, since the control voltage is determined using the average received light power being received individual regulations for circumstances are unnecessary. The number of individual regulation processes is reduced, so that the manufacture/regulation can effectively be simplified.

Furthermore, in order to change the reference voltage Vref in the differential amplifier 17 as the reference of the regulation, the variable resistance 18 may be changed or the voltage Vb1 to be applied to the variable resistance 18 may be changed, so that the regulation can be simplified.

Figure 7:
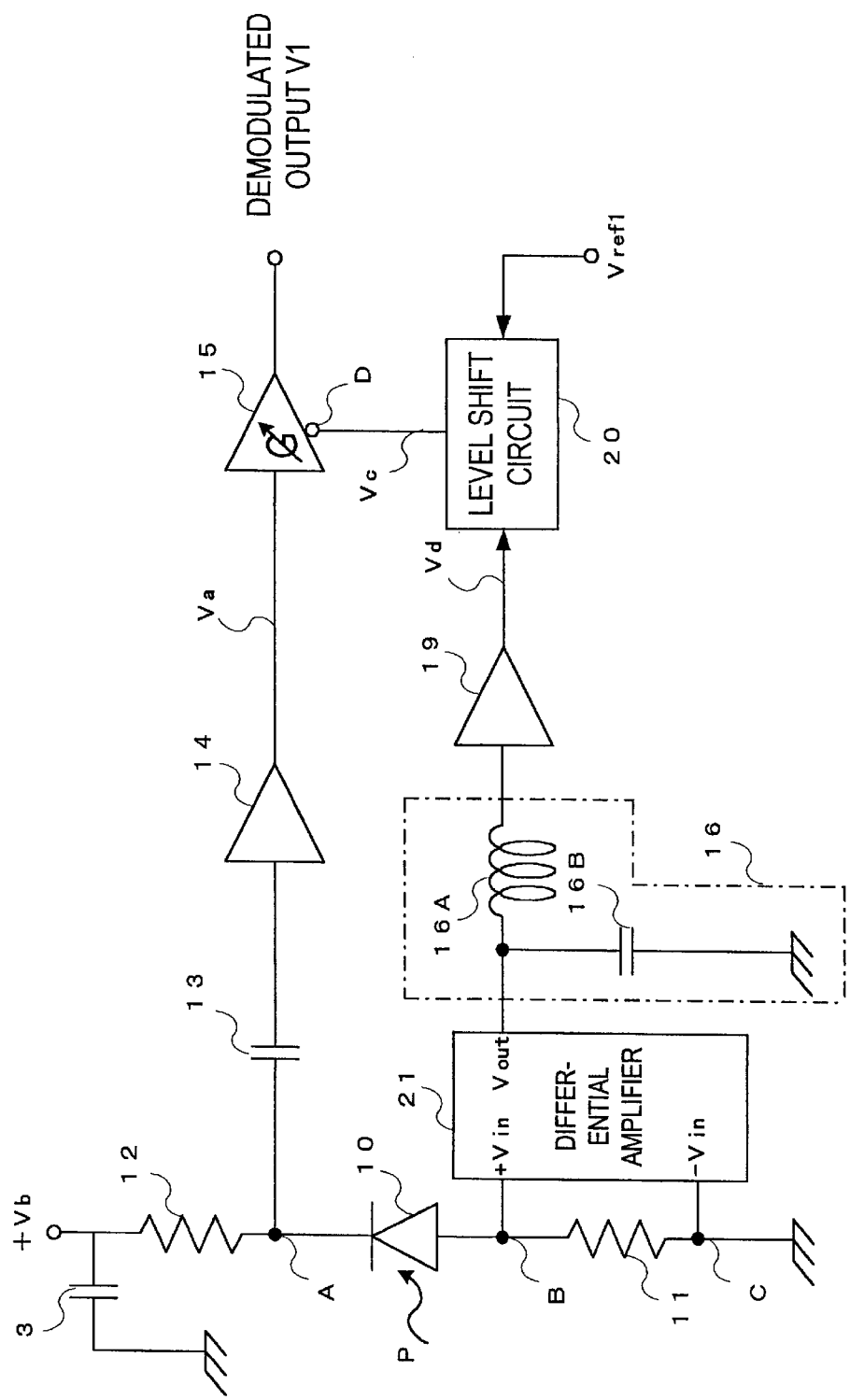
FIG. 7 is a circuit diagram showing the second light receiving circuit according to the present invention.

Another (second) embodiment of the light receiving circuit for realizing the photoelectric conversion method of the present invention will next be described with reference to FIG. 7. FIG. 7 is a circuit diagram showing the second light receiving circuit of the present invention.

In the light receiving circuit according to the second embodiment of the present invention, a light signal is received by a light receiving diode, and converted to a high-frequency electric signal by the generation of a photoelectric current corresponding to a light intensity. An alternating component is removed from the electric signal and a direct current component is taken out by a low-pass filter to detect the average received light level of the light. The average received light level is shifted based on the preset reference voltage in the level shift circuit. The shifted voltage is outputted as a control voltage in a variable gain amplifier, and the electric signal is amplified or attenuated with the gain corresponding to the control voltage in the variable gain amplifier to obtain a demodulated signal. Even if the average received light level varies, a constant output level of demodulated signal can always be obtained.

The second light receiving circuit of the present invention is roughly similar to the first light receiving circuit shown in FIG. 1, but different therefrom in that an amplifier 19 and a level shift circuit 20 are provided instead of the variable resistance 18 and the differential amplifier 17.

Additionally, an operating amplifier may be used instead of the level shift circuit 20.

Moreover, in the same manner as the first light receiving circuit, the electronic attenuator 22 may be used instead of the variable gain amplifier 15, the differential amplifier 21 may be omitted, and the low-pass filter 16 may be IC filter.

The operation of the second light receiving circuit of the present invention is substantially the same as that of the first light receiving circuit. However, in the second light receiving circuit, after the alternating component is removed by the low-pass filter 16, the direct current component is amplified by the amplifier 19 to form Vd, the level of Vd is shifted based on the preset reference voltage Vref1 by the level shift circuit, and the control voltage Vc is transmitted to the control terminal D of the variable gain amplifier 15.

Figure 8:
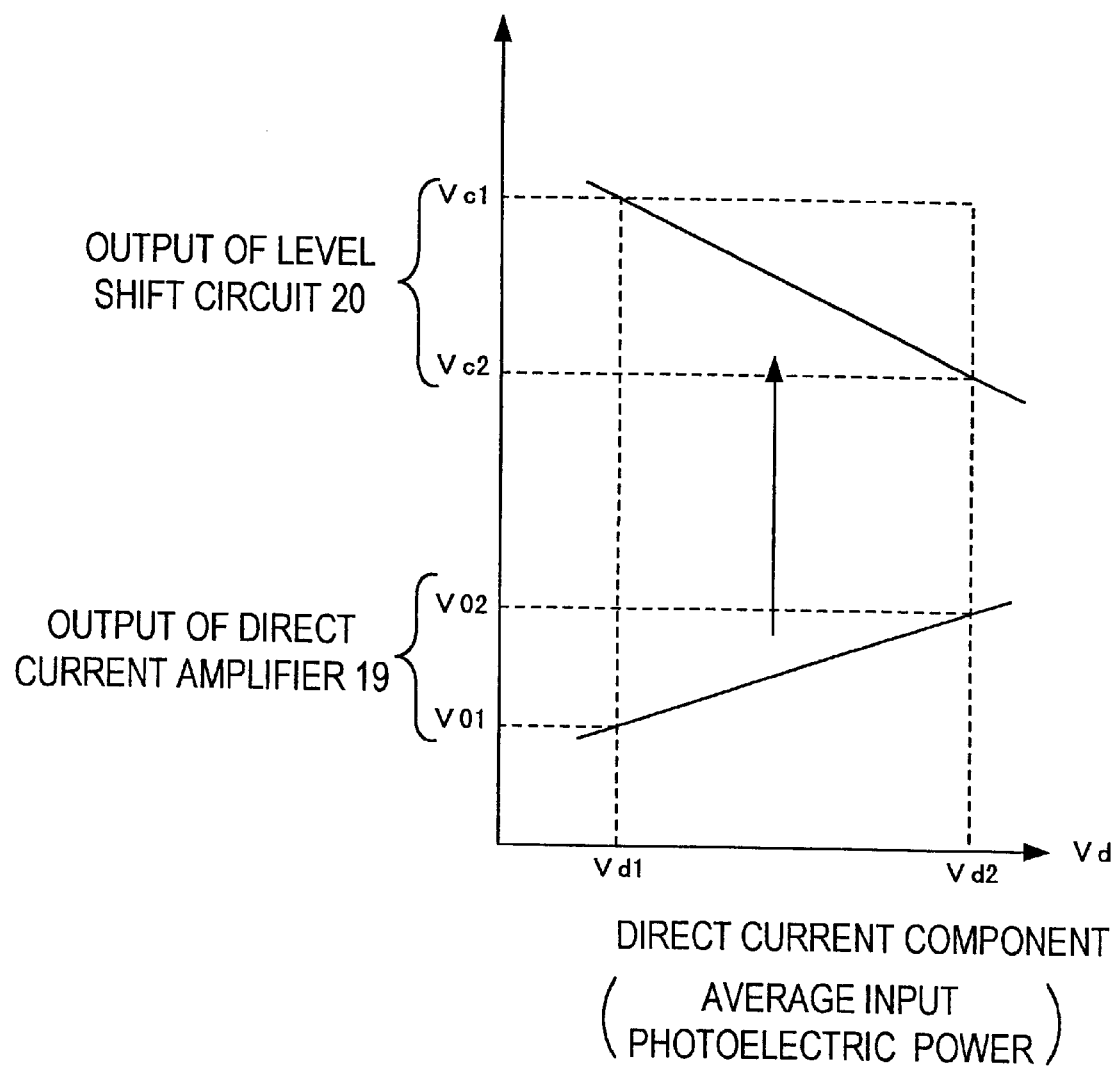
FIG. 8 is an explanatory view showing an amplification characteristic of an amplifier and a level shift circuit in the second light receiving circuit of the present invention.

For example, as shown in FIG. 8, the relationship of the direct current component Vd and the control voltage Vc is set as the characteristics of the amplifier 19 and the level shift circuit 20. Then, in the case of the direct current component Vd=Vd1, V01 is determined corresponding to Vd1 from FIG. 8 in the amplifier 19. Furthermore, the corresponding Vc1 is determined in the level shift circuit 20, and the gain G1 is obtained with the Vc1 from the gain control characteristic shown in FIG. 2 in the variable gain amplifier 15.

Similarly, in the case of the direct current component Vd=Vd2, V02 is determined corresponding to Vd2 from FIG. 8 in the amplifier 19. Furthermore, the corresponding Vc2 is determined in the level shift circuit 20, and the gain G2 can be obtained with the Vc2 from the gain control characteristic shown in FIG. 2 in the variable gain amplifier 15.

FIG. 8 is an explanatory view showing the amplification characteristics of the amplifier 19 and the level shift circuit 20 in the second light receiving circuit of the present invention. Additionally, in FIG. 8, the direct current component Vd is shown along the X-axis. Since this is naturally a voltage corresponding to the average input photoelectric power, the average input photoelectric power Pr may be considered instead of the direct current component Vd.

Therefore, in the second light receiving circuit, even if the direct current component Vd varies, the control voltage Vc corresponding to Vd can be obtained, and the gain G of the variable gain amplifier 15 is controlled in such a manner that the output power level becomes constant irrespective of the fluctuation of Vd.

Additionally, the level characteristic of the level shift circuit 20 can be changed variously by changing the reference voltage Vref1.

Here, one example of level shift circuit 20 will be described.

In the second light receiving circuit, the demodulated output V1 is obtained by incoming of the light signal P to the pin diode 10. As described earlier, the power of the demodulated output V1 is proportional to the square of average input photoelectric power of the light signal P. Also, the variation range of the average input photoelectric power can be predicted according to such as the distribution deviation of optical transmitter or to the condition of system installation plans in which this receiving element.

Therefore, it can be previously determined the variation level of the demodulated output V1, and value of V1 which should be maintained as constant.

The relationship among Vc, Vd, and Vref1 are described as below with substantial values.

Now, suppose that the output of the amplifier 19 is changed from Vd1 to Vd2 according to the predetermined variation of the light signal P, and also suppose that, at that time, in order to keep the demodulated output V1 as constant, it is necessary to linearly change the control voltage of the variable gain amplifier 15 from Vc1 to Vc2.

As an example, suppose that when the Vd1=2.7V, the Vc1=2.2V, and when the Vd2=3.1V, the Vc2=1.6V in the later description.

Applying above values to the equation depicted characteristics of the level shift circuit 20, $$Vc = A \cdot Vd + B$$

where A and B are the coefficients, and obtain A and B, to determine the composition of the level shift circuit 20 and the reference voltage. According to the computation, the coefficients are solved as A=−1.5, B=6.25, and hence, relationship equation which the level shift circuit 20 should output becomes as $$Vc = -1.5Vd + 6.25$$

Figure 13:
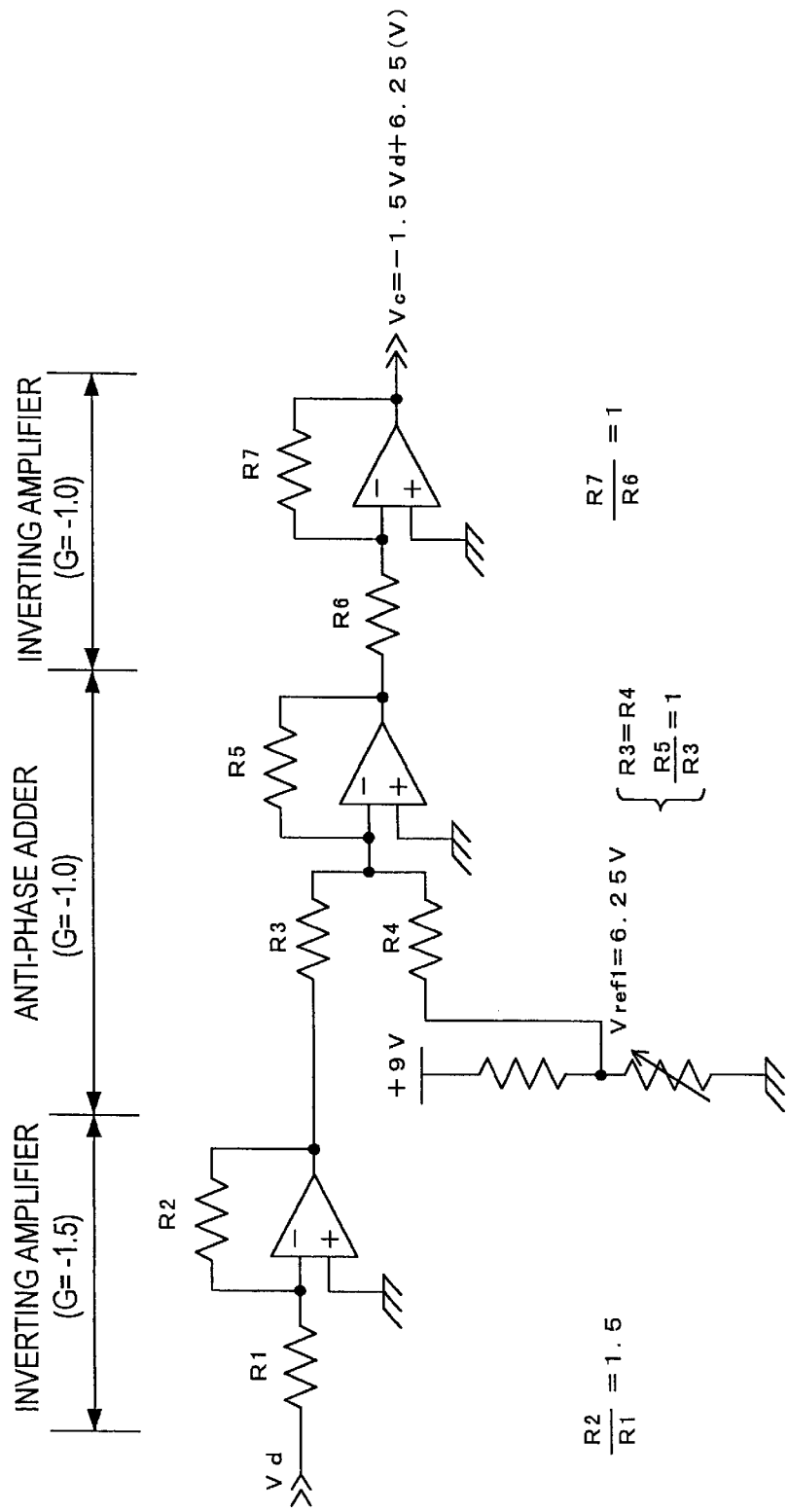
FIG. 13 is a circuit diagram showing the example of concrete level shift circuit 20 according to the present invention.

Accordingly, the level shift circuit 20 is, as shown in FIG. 13, composed with an inverting amplifier whose gain G=1.5, and an adder (whose gain is 1) which adds reference voltage Vref1=6.25V and output of this inverting amplifier, and another inverting amplifier whose gain is 1. FIG. 13 is a circuit diagram showing the example of concrete level shift circuit 20 according to the present invention.

Here, level shift circuit shown in FIG. 13 can be realized with simple operational amplifier circuit, and reference voltage Vref1 can be changed according to the condition as a variable, and hence, errors between the design and real device can be dumped, and engineering in accordance with any conditions is enabled.

In the light receiving circuit according to the second embodiment of the present invention, the direct current component (average received light level) in the received light voltage is taken out by the low-pass filter 16, the control voltage is generated in accordance with the reference voltage in the level shift circuit 20 for shifting the level, and the alternating component in the received light voltage is amplified with the gain according to the control voltage to obtain the demodulated signal. Therefore, there is an effect that the same level of demodulated signal can be obtained irrespective of the fluctuation in the level of the received light voltage.

Figure 9:
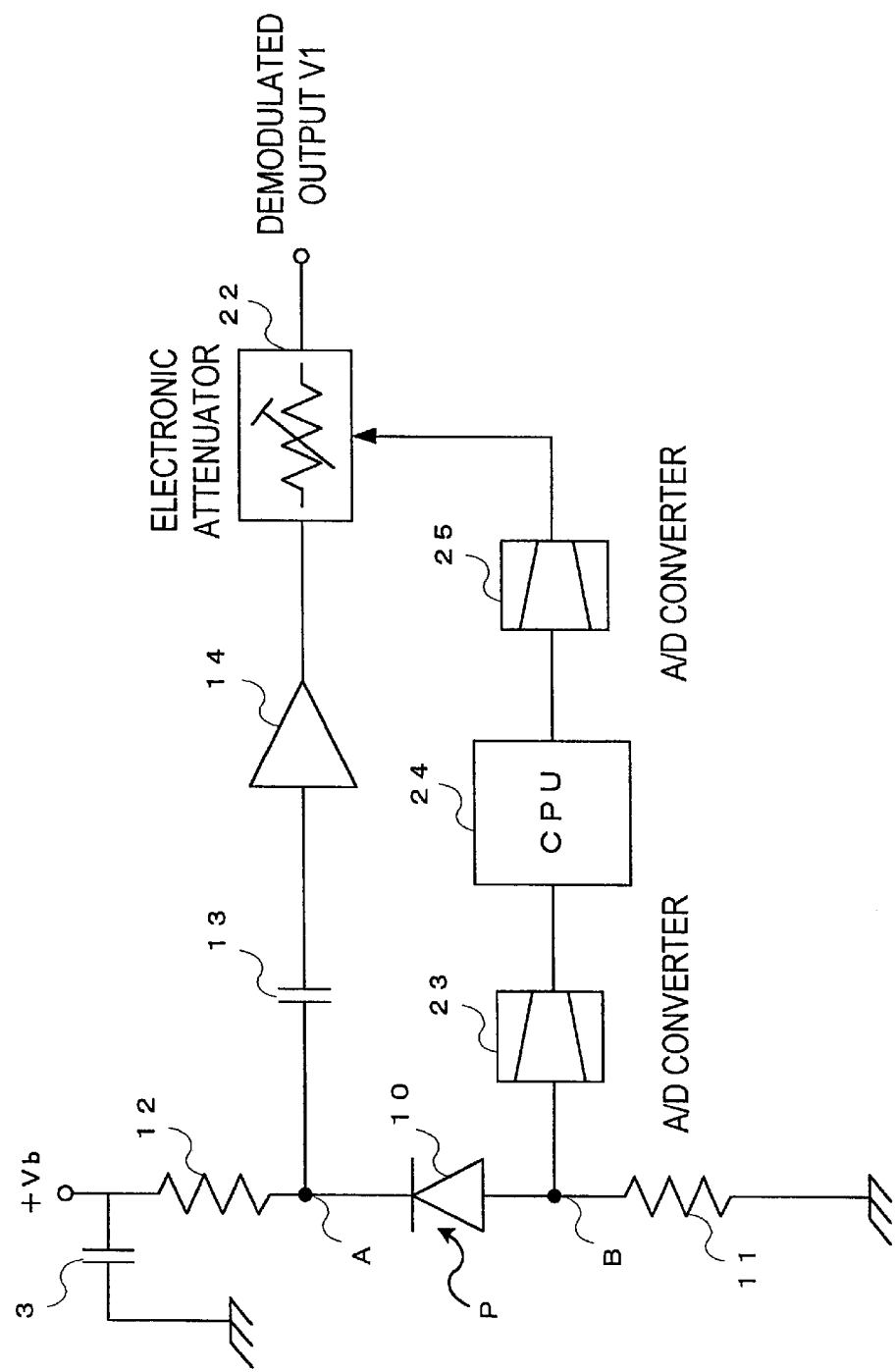
FIG. 9 is a circuit diagram showing the third light receiving circuit of the present invention.

Further (third) embodiment of the light receiving circuit for realizing the photoelectric conversion method of the present invention will next be described with reference to FIG. 9. The third embodiment is specifically efficient when the direct current component Vd and control voltage Vc does not have the simple linear relationship as in the second embodiment. FIG. 9 is a circuit diagram showing the third light receiving circuit of the present invention.

In the light receiving circuit according to the third embodiment of the present invention, a light signal is received by a light receiving diode, and converted to a high-frequency electric signal by the generation of a photoelectric current corresponding to a light intensity. The control voltage value corresponding to the difference of the average value and the reference voltage value is calculated by digitizing and averaging the voltage level of the electric signal, and converted to an analog value to output the control voltage in a variable gain amplifier. The electric signal is amplified or attenuated with the gain corresponding to the control voltage to obtain a demodulated signal. Even if the average received light level varies, a constant output level of demodulated signal can always be obtained.

The third light receiving circuit of the present invention is roughly the same as the first light receiving circuit shown in FIG. 1, but different therefrom in that A/D converter 23, CPU 24, and D/A converter 25 are provided instead of the differential amplifier 21, the variable resistance 18 and the differential amplifier 17. Additionally, in FIG. 9, an electronic attenuator 22 is provided instead of the variable gain amplifier 15.

Here, CPU 24 performs a control voltage value calculation process to calculate the gain control voltage value for controlling the gain in the electronic attenuator 22 in accordance with the value of the inputted received light voltage.

Figure 10:
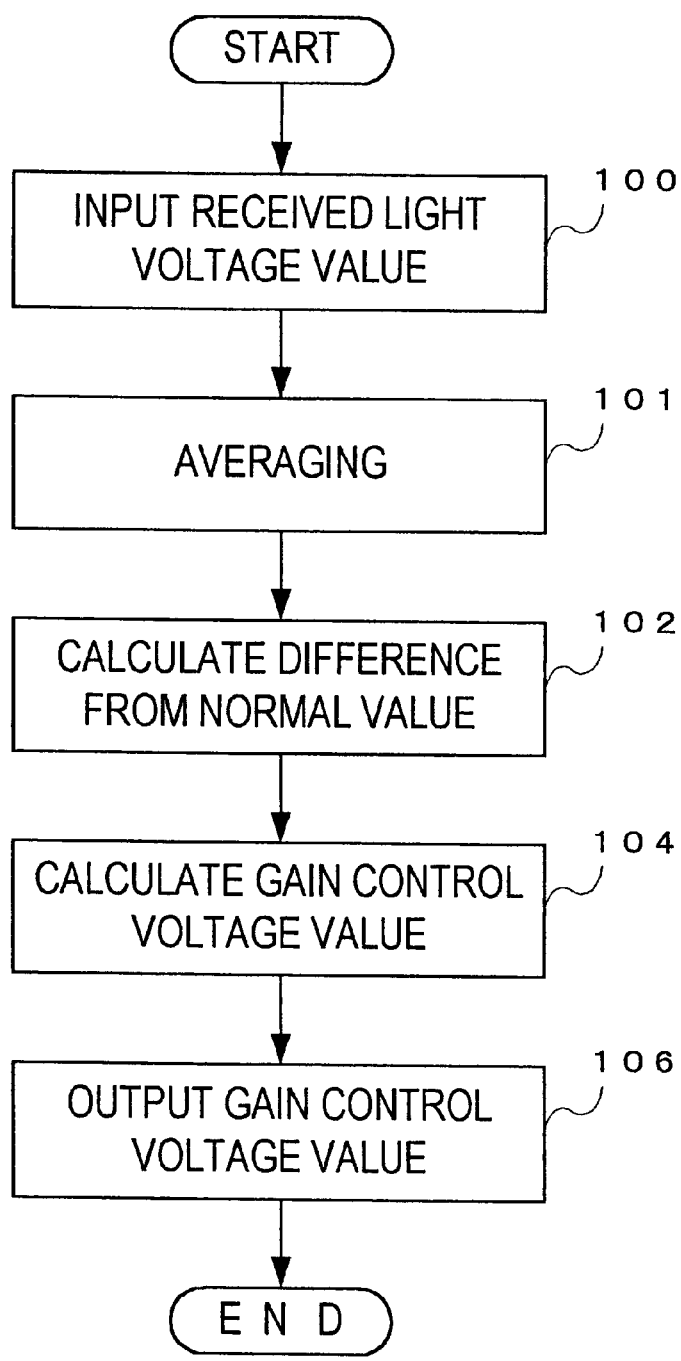
FIG. 10 is a flowchart showing the flow of a control voltage value calculation process in CPU of the third light receiving circuit of the present invention.

The flow of the control voltage value calculation process in CPU 24 will be described with reference to FIG. 10. FIG. 10 is a flowchart showing the flow of the control voltage value calculation process in CPU 24 of the third light receiving circuit according to the present invention.

In the control voltage value calculation process in CPU 24 of the present invention, the received light voltage value transmitted from A/D converter 23 is inputted (100), the inputted voltage value is averaged in a specified time to obtain the average value (101), a difference of the obtained average value and the preset reference voltage value is calculated (102), the gain control voltage value is calculated according to the calculated difference (104), and the calculated gain control voltage value is transmitted to D/A converter 25 (106), thereby completing the control voltage value calculation process.

Here, the reference value may be changed.

Additionally, the gain control voltage value calculation process of the process 104 includes a method of performing calculation following an operation equation, a method of establishing correspondence with a table in which the gain control voltage value corresponding to the difference is preset, and the like. Any calculation method may be used as long as the gain control voltage value can be derived for controlling the gain G of the electronic attenuator 22 to make constant the output power level irrespective of the value of the received light voltage.

In operation of the third light receiving circuit of the present invention, the output voltage of the point B is converted to a digital value in the A/D converter 23 and transmitted to the CPU 24 as the received light voltage value. The gain control voltage value corresponding to the received light voltage value is calculated in the CPU 24, converted to an analog value in the D/A converter 25, and supplied to the electronic attenuator 22.

For the output voltage of the point A, a direct current component is removed by the capacitor 13, and only an alternating component is transmitted and amplified in the initial-stage amplifier 14 to form a signal Va. In the electronic attenuator 22 the control voltage corresponding to the gain control voltage value is received from the D/A converter 25, the gain G is determined in accordance with the magnitude of the control voltage, and the modulated output is attenuated in accordance with the gain G to obtain a demodulated output V1.

In the light receiving circuit according to the third embodiment of the present invention, the received light voltage is converted to the digital received light voltage value in the A/D converter 23. The gain control voltage value corresponding to the received light voltage value is calculated in accordance with the reference voltage value in the CPU 24, and converted to the analog control voltage in the D/A converter 25. The alternating component of the received light voltage is amplified with the gain according to the control voltage to obtain the demodulated signal.

Therefore, the same level of demodulated signal can effectively be obtained irrespective of the fluctuation of the received light voltage level.

In the aforementioned embodiments, the reference voltage Vref, Vref1 or the reference voltage value held by the CPU 24 is not related with the demodulated output V1 from the variable gain amplifier 15 (or the electronic attenuator 22), but correspondence may be established to apply a negative feedback based on V1. Alternatively, the negative feedback of the output V1 may be applied for Vc.

Figure 11:
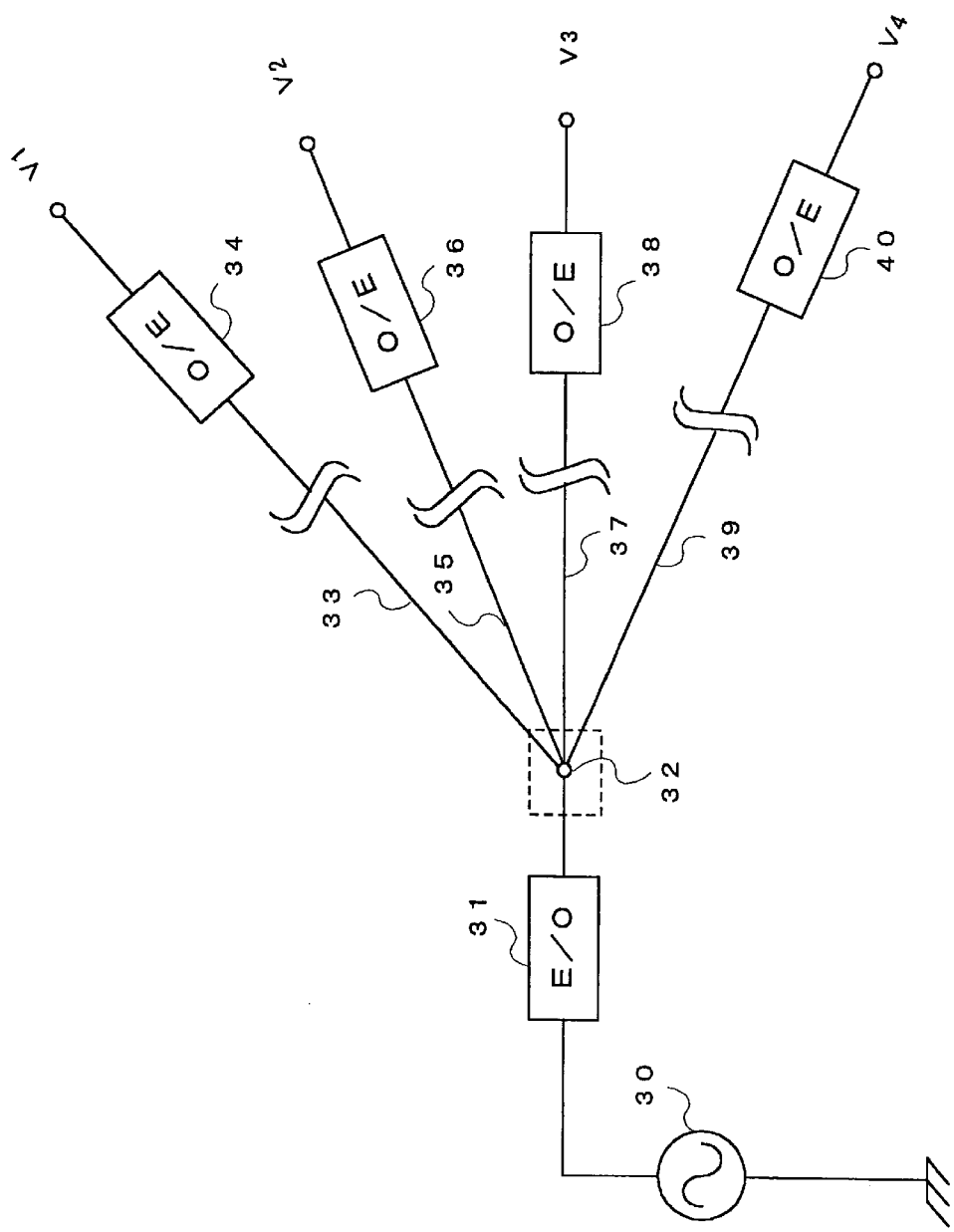
FIG. 11 is a block diagram showing an example in which the light receiving circuit of the present invention is applied to an optical communication system.
Figure 12:
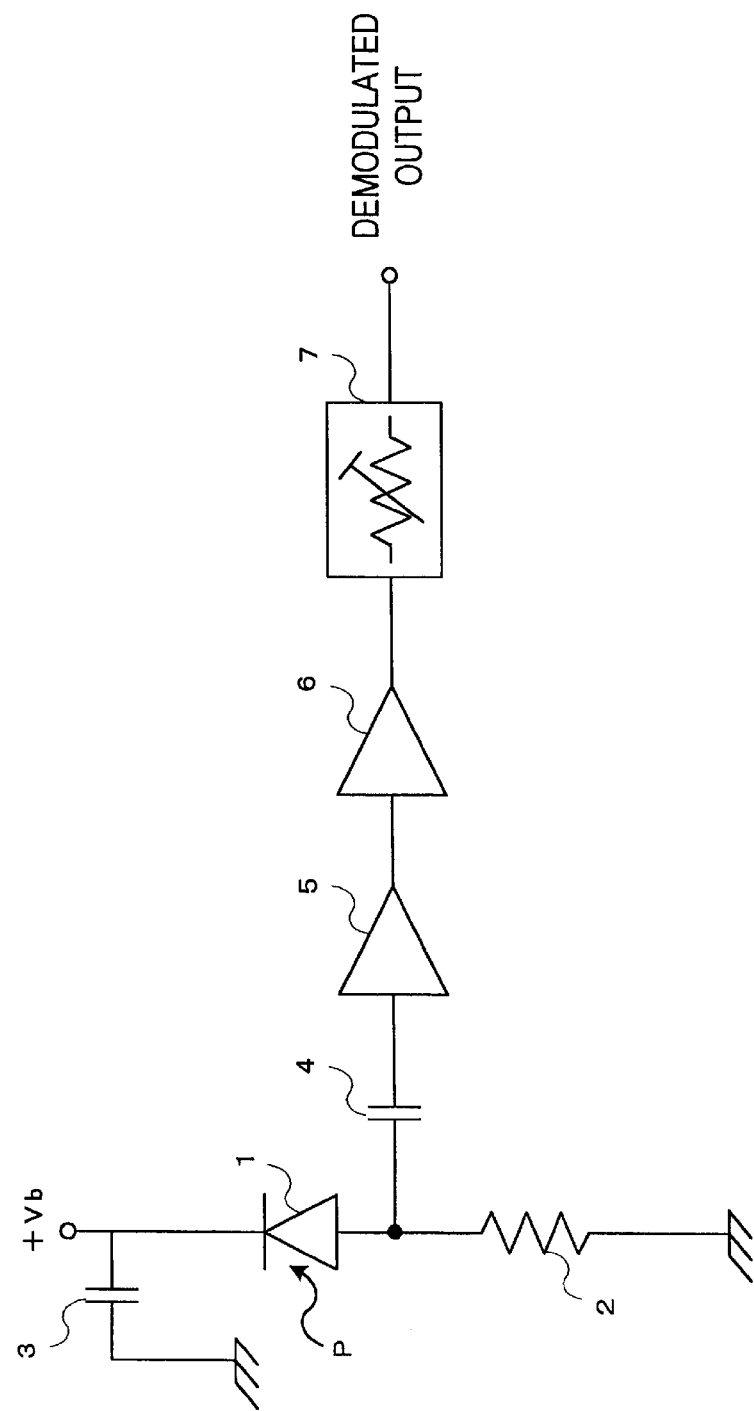
FIG. 12 is a circuit diagram showing the conventional light receiving circuit.

The optical communication system using the light receiving circuit of the present invention will next be described with reference to FIG. 11. FIG. 11 is a block diagram showing an example in which the light receiving circuit of the present invention is applied to the optical communication system.

The optical communication system using the light receiving circuit of the present invention comprises a high-frequency source 30 for generating a high-frequency signal; an electric/optical conversion circuit (E/O in FIG. 11) 31 for analog-optical modulating the high-frequency signal to output a light signal; a star photocoupler 32 for multi-distributing the light signal; optical fibers 33, 35, 37, 39 (four in the example) for transmitting the distributed light signals; and light receiving circuits (O/E in FIG. 11) 34, 36, 38, 40 for demodulating the transmitted light signals to obtain demodulated signals.

Here, the aforementioned light receiving circuit of the present invention (shown in FIG. 1, 7 or 9) is used as the light receiving circuit 34, 36, 38, 40. Parameters (Va, Vd, G, Vref, the shift level, the reference voltage value in the CPU 24, and the like) of the light receiving circuits 34, 36, 38, 40 are related with one another in such a manner that all demodulated outputs V1 to V4 from the light receiving circuits have the same output power level.

In operation of the optical communication system of the present invention, the high-frequency signal generated by the high-frequency source 30 is analog-optical modulated in the electric/optical conversion circuit 31 to obtain the light signal. The light signal is distributed to multiple signals by the star photocoupler 32, which are transmitted to the light receiving circuits 34, 36, 38, 40 via the optical fibers 33, 35, 37, 39 and demodulated in the light receiving circuits to obtain demodulated signals (transmitted signals) V1 to V4.

In the course of the aforementioned operation, the distribution deviation of the star photocoupler 32, the connection loss dispersion of the connected optical connector, the propagation loss difference because of the difference in the lengths of the optical fibers connecting the star photocoupler 32 and the light receiving circuits, and the like cause nonuniform received light levels in the light receiving circuits. However, the amplification (attenuation) gain is regulated in accordance with the received light level in each light receiving circuit. Therefore, the demodulated signals outputted from the light receiving circuits have the same level, so that the nonuniformity of the level in the course of transmission is eliminated. The powers of the same values can be obtained as a plurality of demodulated high-frequency signals.

In the light receiving circuit according to the embodiment of the present invention, the electric signal is amplified (or attenuated) with the gain corresponding to the average received light level to obtain the demodulated signal. Therefore, the fluctuation of the output level of the demodulated signal attributed to the fluctuation of the average received light level caused by the difference of the transmission distance in the analog light signal transmission system can be absorbed. An effect is produced that the electric signal output of the constant value can be obtained irrespective of the average received light level.

Moreover, in the light receiving circuit according to the embodiment of the present invention, the control voltage is determined using the average received light power being received. Therefore, the regulation does not need to be performed in accordance with individual circumstances. The number of individual regulation processes is reduced, so that the manufacture/regulation can effectively be simplified.

Furthermore, in the optical communication system using the light receiving circuit of the present invention, even if the average received light level differs in each light receiving circuit, the electric signal is amplified (attenuated) with the gain corresponding to the average received light level in each light receiving circuit to obtain the demodulated signal. Therefore, the demodulated signals having constant output levels can be obtained in the entire system. The advantage is that the circuit structure in the latter stage of the light receiving circuit can be simplified and that the system structure can be made simple and inexpensive.

According to the present invention, the received light is converted to the electric signal, the average received light level of the received light is detected, and the electric signal is amplified or attenuated based on the detected average received light level to obtain the demodulated signal. Therefore, in the photoelectric conversion method, by reflecting the average received light level on the amplification or attenuation of the electric signal, even if the average received light level of the received light varies, a constant output level of demodulated signal can always be obtained.

Moreover, according to the present invention, the received light is converted to the electric signal, and the alternating component is removed and the direct current component is taken out from the received light to detect the average received light level of the light. The difference of the average received light level and the preset reference voltage is amplified to obtain the control voltage, and the electric signal is amplified or attenuated with the gain corresponding to the control voltage to obtain the demodulated signal. In the photoelectric conversion method, by reflecting the average received light level on the amplification or attenuation of the electric signal, even if the average received light level of the received light varies, a constant output level of demodulated signal can always be obtained.

Furthermore, according to the present invention, the received light is converted to the electric signal, and the alternating component is removed and the direct current component is taken out from the received light to detect the average received light level of the light. The average received light level is shifted based on the preset reference voltage to obtain the control voltage, and the electric signal is amplified or attenuated with the gain corresponding to the control voltage to obtain the demodulated signal. In the photoelectric conversion method, by reflecting the average received light level on the amplification or attenuation of the electric signal, even if the average received light level of the received light varies, a constant output level of demodulated signal can always be obtained.

Additionally, according to the present invention, the received light is converted to the electric signal, and the received light voltage value obtained from the received light is converted to the digital value and averaged to obtain the average received light level. The control voltage value is obtained corresponding to the difference of the average received light level and the preset reference voltage value, and converted to the analog signal. The electric signal is amplified or attenuated with the gain corresponding to the analog signal to obtain the demodulated signal. In the photoelectric conversion method, by reflecting the average received light level on the amplification or attenuation of the electric signal, even if the average received light level of the received light varies, a constant output level of demodulated signal can always be obtained.

Moreover, according to the present invention, the direct current component of the electric signal generated in response to the light received by the light receiving element is removed by the capacitor to output the alternating component. On the other hand, the alternating component of the electric signal generated in response to the light received by the light receiving element is removed by the low-pass filter or the IC filter to output the direct current component as the average received light level. The difference of the average received light level and the preset reference voltage is amplified by the differential amplifier to obtain the control voltage. The electric signal of the alternating component is amplified or attenuated with the gain corresponding to the control voltage in the variable gain amplifier or the electronic attenuator. In the light receiving circuit, by reflecting the average received light level on the amplification or attenuation of the electric signal, even if the average received light level of the received light varies, a constant output level of demodulated signal can always be obtained.

Furthermore, according to the present invention, the direct current component of the electric signal generated in response to the light received by the light receiving element is removed by the capacitor to output the alternating component. On the other hand, the alternating component of the electric signal generated in response to the light received by the light receiving element is removed by the low-pass filter or the IC filter to output the direct current component as the average received light level, and the average received light level is shifted based on the preset reference voltage in the level shift circuit or the operating amplifier to obtain the control voltage. The electric signal of the alternating component is amplified or attenuated with the gain corresponding to the control voltage in the variable gain amplifier or the electronic attenuator. In the light receiving circuit, by reflecting the average received light level on the amplification or attenuation of the electric signal, even if the average received light level of the received light varies, a constant output level of demodulated signal can always be obtained.

Additionally, according to the present invention, the direct current component of the electric signal generated in response to the light received by the light receiving element is removed by the capacitor to output the alternating component. On the other hand, the electric signal generated in response to the light received by the light receiving element is converted to the digital signal by the A/D converter, and the digital signal is averaged in the controller to obtain the average received light level. The control voltage value is obtained corresponding to the difference of the average received light level and the preset reference voltage value, and converted to the analog signal by the D/A converter. In the variable gain amplifier or the electronic attenuator the voltage of the analog signal is received as the control voltage, and the electric signal of the alternating component is amplified or attenuated with the gain corresponding to the control voltage. In the light receiving circuit, by reflecting the average received light level on the amplification or attenuation of the electric signal, even if the average received light level of the received light varies, a constant output level of demodulated signal can always be obtained.

Moreover, according to the present invention, the differential amplifier for amplifying the electric signal generated in the light receiving element is provided between the other end of the light receiving element and the low-pass filter or the IC filter. In the light receiving circuit, even if the average received light level is small, the differential amplifier or the level shift circuit for outputting the control voltage can be operated stably. Therefore, a constant output level of demodulated signal can effectively be obtained stably.

Furthermore, according to the present invention, the high-frequency signal generated in the high-frequency source is analog-optical modulated in the electric/optical conversion circuit to output the light signal, which is distributed by the star photocoupler and transmitted via the optical fibers. The transmitted light signal is demodulated in the light receiving circuit to 13 to obtain the demodulated signal. Therefore, even if the light signal is transmitted with a transmission loss which varies with a path, and differs in the average received light level in each light receiving circuit, a constant output level of demodulated signal can be obtained in the entire system. Because the electric signal is amplified (attenuated) in accordance with the average received light level in each light receiving circuit to obtain the demodulated signal. Therefore, the constant output level of demodulated signal can be obtained in the entire system, the circuit structure in the latter stage of the light receiving circuit can be simplified, and the system structure can effectively be made simple and inexpensive.

What is claimed is:

1. A light receiving circuit comprising a light receiving element to which a voltage is applied, a capacitor connected to one end of said light receiving element for removing a direct current component of an electric signal generated in response to a light received by said light receiving element and outputting an alternating component, a low-pass filter connected to the other end of said light receiving element for removing the alternating current component of the electric signal generated in response to the light received by said light receiving element and outputting the direct current component as an average received light level, a differential amplifier for amplifying a difference of the average received light level outputted from said low-pass filter and a preset reference voltage, and a variable gain amplifier for receiving a voltage of said amplified difference as a control voltage and amplifying or attenuating the electric signal of the alternating component outputted from said capacitor with a gain corresponding to said control voltage.

2. The light receiving circuit according to claim 1 wherein an electronic attenuator is used instead of the variable gain amplifier.

3. The light receiving circuit according to claim 1, wherein an IC filter is used instead of the low-pass filter.

4. The light receiving circuit according to claim 3 wherein the differential amplifier for amplifying the electric signal generated in the light receiving element is provided between the other end of the light receiving element and the IC filter.

5. The light receiving circuit according to claim 1, wherein the differential amplifier for amplifying the electric signal generated in the light receiving element is provided between the other end of the light receiving element and the low-pass filter.

6. An optical communication system comprising a high-frequency source for generating a high-frequency signal, an electric/optical conversion circuit for analog-optical modulating said high-frequency signal and outputting a light signal, a star photocoupler for distributing said light signal, an optical fiber for transmitting said distributed light signal, and the light receiving circuit according to claim 1 for demodulating the transmitted light signal to obtain a demodulated signal.

* * * * *